United States Patent [19]

Alsenz

[11] Patent Number: 4,697,431
[45] Date of Patent: Oct. 6, 1987

[54] REFRIGERATION SYSTEM HAVING PERIODIC FLUSH CYCLES

[76] Inventor: Richard H. Alsenz, 2402 Creekmeadows, Missouri City, Tex. 77459

[21] Appl. No.: 880,288

[22] Filed: Jun. 30, 1986

Related U.S. Application Data

[63] Continuation-in-part of Ser. No. 639,271, Aug. 8, 1984, Pat. No. 4,651,535.

[51] Int. Cl.$^4$ .................. F25B 41/04; F25B 31/00
[52] U.S. Cl. .................................... 62/225; 62/157; 62/192
[58] Field of Search ............... 62/225, 224, 223, 222, 62/210, 211, 212, 192, 193, 194, 195, 83, 84, 231, 157, 158

[56] References Cited

U.S. PATENT DOCUMENTS

| | | | |
|---|---|---|---|
| 3,537,272 | 11/1970 | Hales et al. | 62/157 |
| 4,459,819 | 7/1984 | Hargraves | 62/212 |
| 4,548,047 | 10/1985 | Hayashi et al. | 62/160 |
| 4,643,002 | 2/1987 | Dennis et al. | 62/525 |

Primary Examiner—Harry Tanner
Attorney, Agent, or Firm—Arnold, White & Durkee

[57] ABSTRACT

A microprocessor controlled system for use in a refrigeration system which includes a plurality of pulse controlled solenoid flow control valves suitable for use as expansion valves is disclosed. A pulse width modulated control signal is generated for cyclically opening and closing the flow through the solenoid expansion valve. The duty cycle of the pulsed control signal determines the average flow rate through the valve. The microprocessor controls, periodically, the opening of each expansion valve to permit full flow therethrough to flush any accumulated compressor lubrication oil logged in any associated evaporator coils.

18 Claims, 14 Drawing Figures

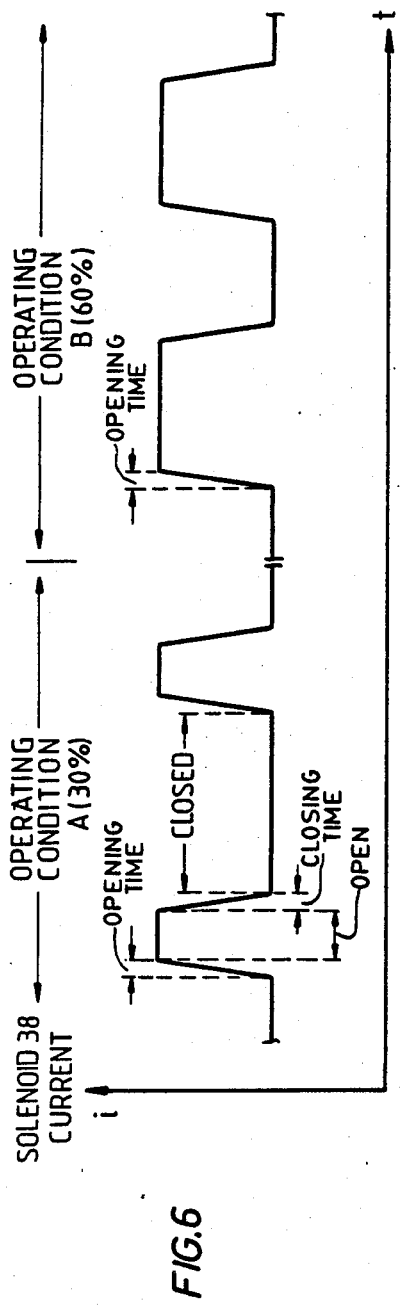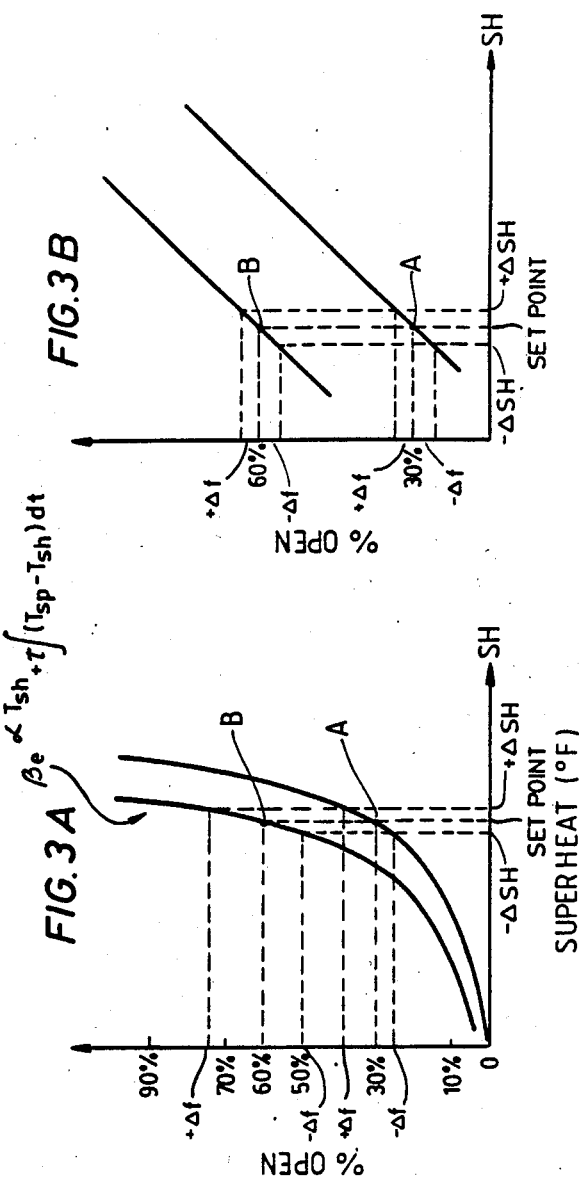

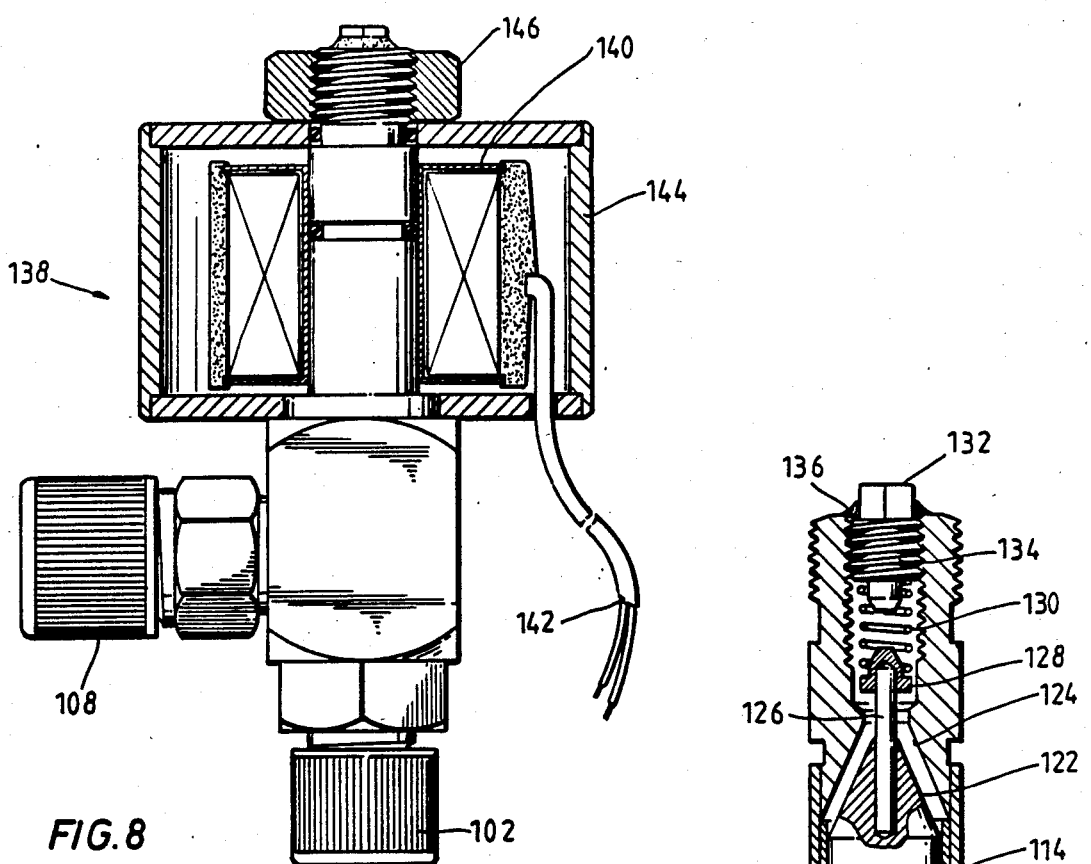
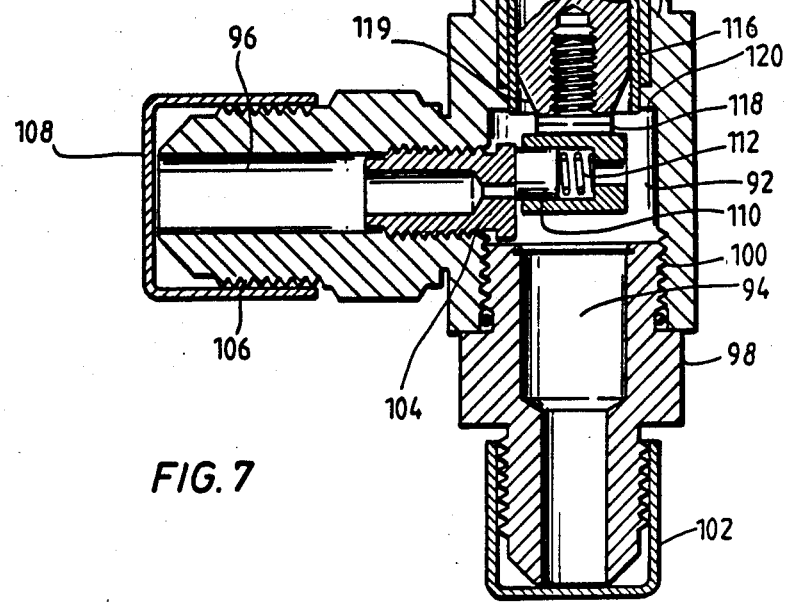
FIG. 8
FIG. 7

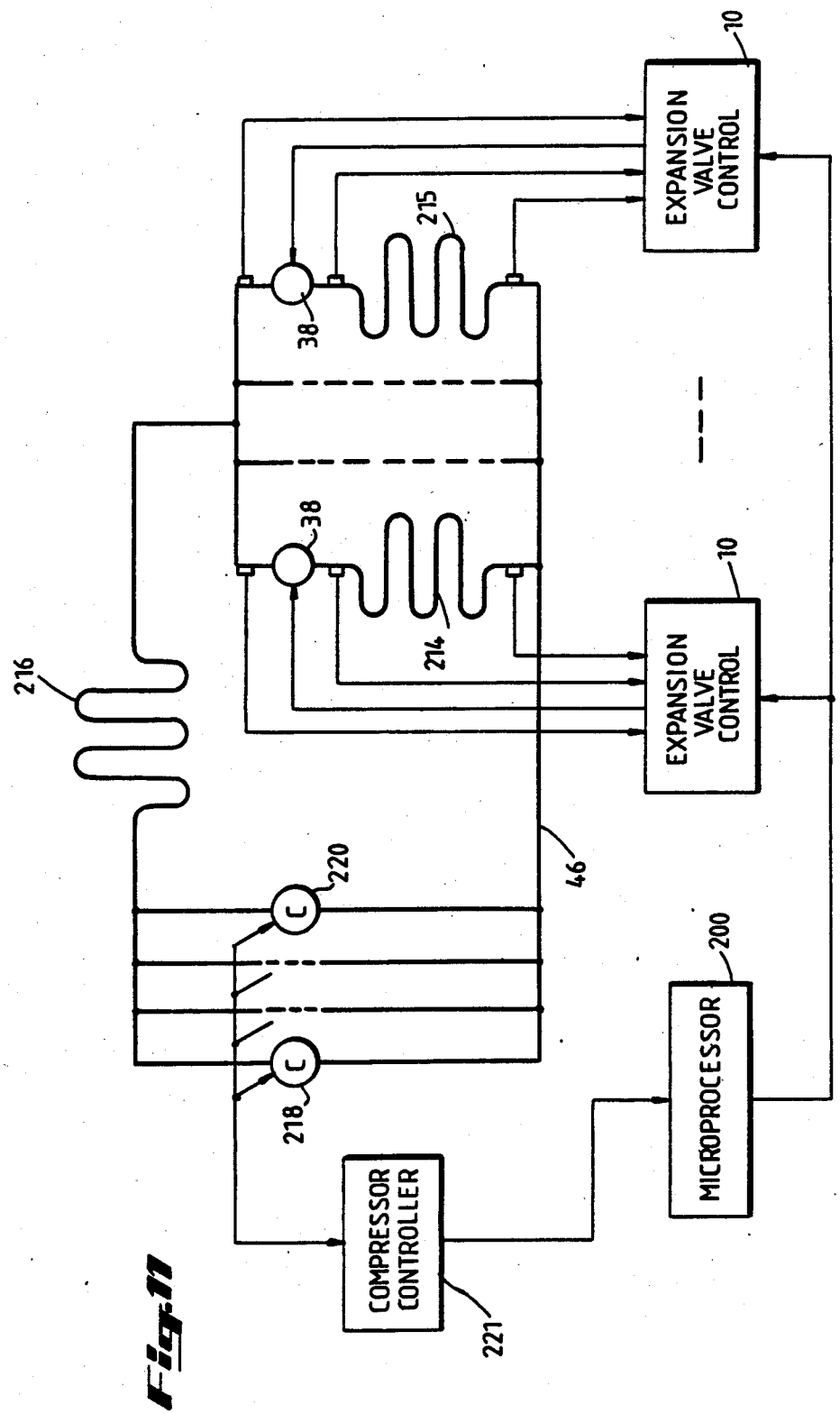

REFRIGERATION SYSTEM HAVING PERIODIC FLUSH CYCLES

CROSS REFERENCE TO RELATED APPLICATION

This application is a continuation-in-part application to U.S. patent application Ser. No. 639,271 filed Aug. 8, 1984 Pat. No. 4,651,535.

BACKGROUND OF THE INVENTION

The present invention relates to refrigeration systems which incorporate electrically actuated solenoid fluid flow control valves. More particularly, the present invention relates to a refrigeration control system which incorporates a microprocessor for monitoring and controlling the system's operation by, for example, controlling one refrigeration system to provide subcooling to another refrigeration system.

A valve which meters fluid flow therethrough in accordance with flow demand, i.e., how much volume of fluid is permitted passage through the valve for a given period of time, typically operates in connection with a control signal developed by sensing a system condition. If the value of the sensed condition is different than a predetermined desired operating point, a control signal is produced for changing the fluid flow opening of the valve to meet the changed flow demand.

A fluid flow control valve is generally designed to operate over a range of flow demands. Typically for such fluid flow valves, the response curve defining the relationship between the sensed condition and the resulting fluid flow rate through the valve is linear over this operating range.

For such a prior-art valve, a given change in the sensed condition at a low demand flow rate will produce a certain change in the flow rate through the valve. This change in flow rate relative to the operating demand flow rate can be expressed as a percentage change. When the valve is operating at a high demand flow rate, the same given change in the sensed condition still produces the same amount change in the flow rate. This amount of change, when expressed as a percentage of the flow rate at the higher operating demand condition, will be less than it was for the lower operating condition. Thus, to effect the same percentage change in the flow rate at the higher demand level, a greater change in the sensed condition must occur. This greater change in the sensed condition to effect the proper change in flow rate represents a disadvantage in these prior-art valves. A control system is more stable when the system can be controlled to the desired operating point respective to small changes in the sensed condition.

An additional disadvantage in these prior-art valves is that the set points or operating points for the sensed condition change depending upon what the demand flow rate through the valve happends to be. Thus, for a 30% demand condition, the operating point would be one value while a 60% demand condition would require a second higher operating set point.

A further disadvantage present in these prior-art flow control valves is characterized by a hysteresis error between the control signal applied to affect a flow condition and the actual flow condition which results. In an error free system, a given control signal should produce a particular flow rate through the valve. Where hysteresis errors are present, changing the control signal a given amount to effect a given change in the flow rate as predicted by the system control transfer function does not necessarily result in such desired change.

This hysteresis error is due to the valve's inability to achieve the desired orifice opening because of mechanical errors, magnetic errors, etc., in the valve's components. In a closed loop control system, such hysteresis errors will result in a continual "hunting" effect by the control signl since any demand must exceed the hysteresis error before any actual change in the flow rate is affected, i.e., the system is essentially underdampened. Such control never actually catches up to the demand. This hysteresis effect is the same whether the demand flow rate increases or decreases.

It is also known in the refrigeration art to provide subcooling of the liquid refrigerant in a low temperature refrigeration system to reduce the energy required for the low temperature system to meet its cooling demand. One of the disadvantages of the prior art methods to accomplish this function was that often times a reduction in the system compressor capacity occurs as a result of a decrease in the cooling load on the low temperature refrigeration system. In the prior art, the amount of subcooling does not change, even though it is no longer needed at that previous level of subcooling. As a result, the maximum energy reduction possible from the subcooling arrangement is not realized because the same amount of energy to provide the subcooling is continued.

Yet another problem in prior art refrigeration systems is the logging of compressor lubrication oil in the evaporator coils of the system. While, ideally, the compressor lubrication oil should remain in the compressor(s) where it is needed, a portion always mixes with the liquid refrigerant and is circulated through the system. From the condenser coil to the evaporator coils, the refrigerant is in its liquid state and transportation of the oil is quite easy. Coming out of the evaporator coils, the refrigerant is in its gaseous state and transportation of the oil is not as easy. In fact, quite a lot of the oil begins to collect in the evaporator coil(s). This oil in the evaporator coil somewhat reduces the efficiency of the evaporator, but more importantly, the accumulated oil is no longer available to the compressor(s) where it is needed.

The prior art has attempted to solve the problem of oil in the evaporator coils by controlling the geometry and line sizes of the piping of each evaporator coil from its output end to a common manifold at the suction side of the compressor(s). Each evaporator coil therefore, had to have its outlet end piped from the cases to the compressor room so that control of velocity of the gaseous refrigerant could be controlled. Wide velocity differences would produce less effective return of the oil. A single return suction line from the cases, i.e., the evaporator coils, to the compressor(s) was not possible where multiple evaporator coils are used, a situation which is true in most refrigeration systems.

Accordingly, it would be advantageous to provide a solenoid flow control valve which operates with essentially zero hysteresis error thereby to achieve the accurate control of the flow rate therethrough. It would also be advantageous to provide a solenoid flow control valve which could be operated in a closed loop control system with only one set point regardless of the flow demand condition through the valve, with a control response function which produces the same percentage change in flow rate to a given sensed condition change at a high demand flow as occurs for the same condition change at a lower demand condition. It would also be advantageous to provide a microprocessor controller for effecting system wide monitoring and control of a plurality of such valves, and to provide feedback control of one such valve in a first refrigeration system providing subcooling to a second refrigeration system when there has been a change in the second system compressor capacity indicative of a reduced cooling load.

It would also be advantageous to provide a method responsive to microprocessor control for periodically flushing logged oil in the evaporators of a refrigeration system to return such oil to the compressor, all without disturbing the normal operations of the system.

SUMMARY OF THE INVENTION

In accordance with the present invention, there is disclosed a control system for use in a refrigeration system having in a closed loop connection a compressor means, a condenser means, a plurality of evaporator means, each evaporator means connected to the condenser means and to the compressor, each evaporator means having an associated expansion valve. The expansion valves are connected between the condenser and the associated evaporator coil. Each valve includes an associated on-off modulator responsive to the instantaneous superheat of the refrigerant in its associated evaporator coil for generating a variable duty cycle on-off modulated solenoid control signal.

The solenoid control signal alternately energizes and de-energizes its associated solenoid for each cycle of the control signal to cycle the valve from a first flow rate position to a second flow rate position. The average flow rate position obtained between the first and second flow rate positions controls the superheat for the refrigerant and the evaporator coil. The valve further includes an indicating means for generating a flow rate signal indicative of the average opening size of the valve for passage of liquid refrigerant therethrough.

In another aspect of the invention, a process is disclosed for periodically flushing each evaporator coil to return compressor lubrication oil back to the compressors. In a first step the microprocessor means closes each solenoid expansion valve for a fixed period of time to permit evacuation of all liquid refrigerant from associated evaporator coil(s). The solenoid expansion valves are then open for full flow for a second period of time. The second period of time is less than the time it would take for the evaporator to become filled with liquid refrigerant. In a narrower aspect, the microprocessor means controls each of the valves individually, in groups, or all together simultaneously to flush the oil.

In an alternate embodiment, the flushing of oil from the evaporator coils is obtained by controlling the solenoid expansion valves to periodically open for full flow from their normal flow conditions. There is no need for the valve to be fully closed for a period of time prior to the flush cycle.

BRIEF DESCRIPTION OF THE DRAWINGS

For a fuller understanding of the invention, reference should be had to the following detailed description of the preferred embodiment of the invention taken in conjunction with the accompanying drawings in which:

FIG. 2 is an illustration of the control response curve for a typical prior-art expansion valve as used in a closed vapor cycle air conditioning system;

FIG. 3A is a graphical illustration of the control response curves for a closed vapor cycle air conditioning system operated in accordance with the present invention;

FIG. 3B is a graphical representation of the control response curves for a closed vapor cycle air conditioning system operated in accordance with the present invention where the present invention utilizes the linear relationship typically found in prior-art expansion valves;

FIG. 5C is placed to the right of FIG. 5B, and FIG. 5A is placed to the left of FIG. 5B;

FIG. 6 is a timing diagram illustration of the pulse width modulated signal from the voltage-to-pulse width converter 26 for the two typical operating conditions as illustrated in FIG. 3A;

FIG. 7 is a vertical cross-sectional view of a preferred embodiment of a mechanical valve in accordance with the present invention;

FIG. 8 is a vertical cross-sectional view of a solenoid coil and housing combination for providing magnetic flux to the plunger shown in FIG. 7;

FIG. 11 is a diagrammatic illustration of a refrigeration system having a plurality of compressors and a plurality of evaporator coils, each controlled by a solenoid actuated expansion valve, and a central microprocessor means for monitoring and controlling the operations of the solenoid expansion valves.

Similar reference numerals refer to similar parts throughout the several drawings.

DETAIL DESCRIPTION OF THE PREFERRED EMBODIMENT

Figure 1:
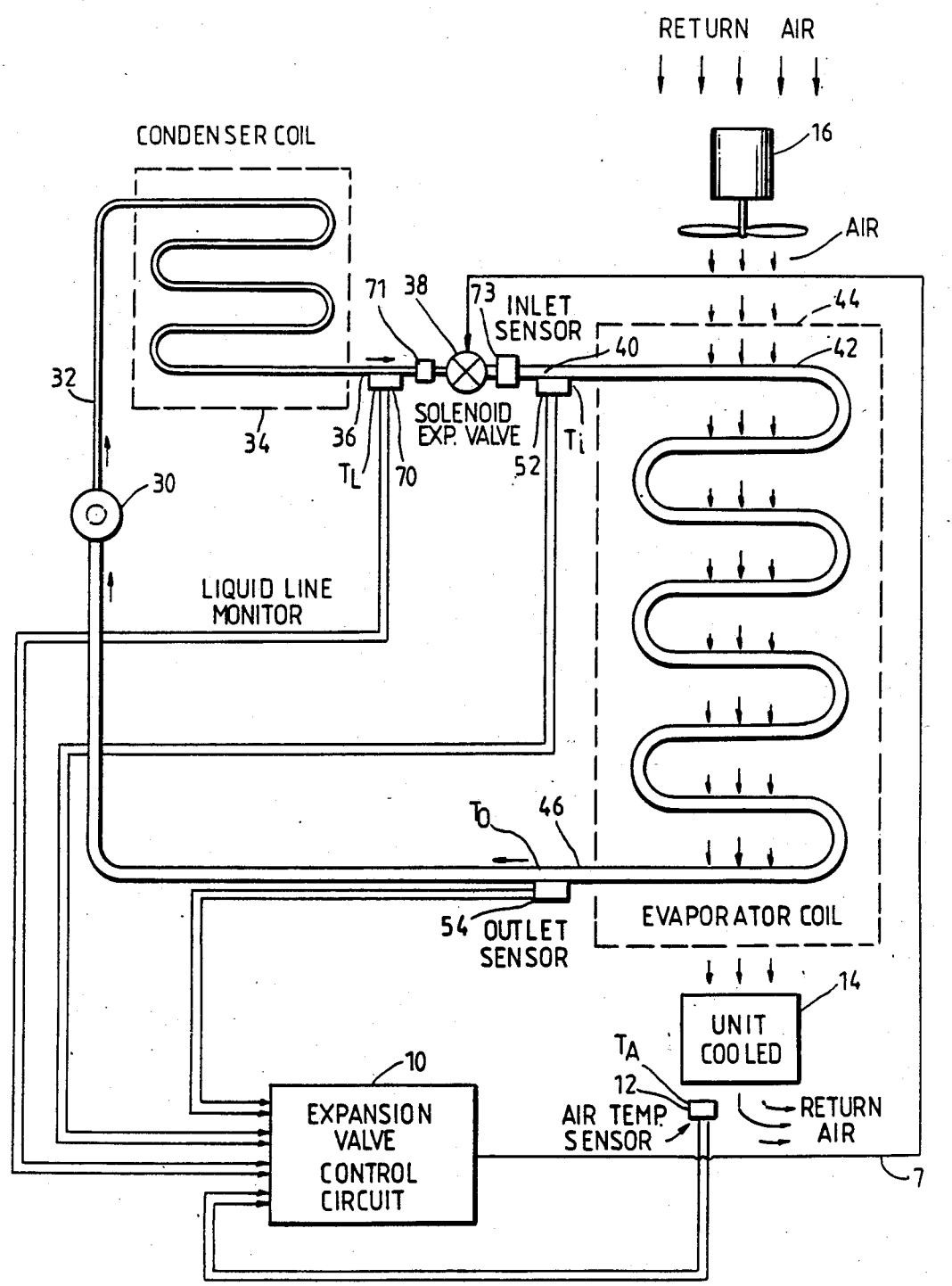
FIG. 1 is a functional block diagram of a closed vapor cycle refrigeration or air conditioning system incorporating an electrically-actuated solenoid fluid flow valve and an associated valve control circuit operated in accordance with the present invention.

Referring now to the drawings and first to FIG. 1, there is illustrated a functional diagram for a closed vapor cycle refrigeration or air conditioning system which incorporates an electrically-actuated solenoid flow control valve 38, operated in accordance with the present invention, and functioning as the expansion valve for the air conditioning system. The solenoid expansion valve 38 responds to its associated expansion valve control circuit 10 as part of a closed loop feedback control system for regulating the cooling from the air conditioning system.

A closed vapor cycle air conditioning system generally comprises a compressor 30, a condenser 34, an expansion valve 38, and an evaporator coil 44, all connected in a closed series loop generally in the order given. The expansion valve is the throttling or metering device which controls the operation of the system, and typically, such expansion valves are mechanical devices. The refrigerant gas is first compressed in the compressor 30. The compressed refrigerant vapor is then discharged to a condenser coil through line 32, where it is cooled and condensed to a liquid refrigerant into the liquid line 36. The liquid refrigerant then flows through the expansion valve 38, expanding while it does so. In some systems, line restrictions 71, 73, respectively in front of and behind expansion valve 38, can be incorporated to help regulate the flow rate through the valve. Conventionally, the expansion valve is controlled by the superheat of the return gas in the suction line 46 at the outlet end of the evaporator coil 44. Superheat is a term of art which is generally defined as the temperature of the refrigerant vapor above the evaporated temperature of the refrigerant, both measured at the same pressure. In closed vapor cycle air conditioning systems, the superheat of the refrigerant coolant is generally defined as the temperature difference between the temperature of the gaseous vapor at the outlet side of the evaporator coil 44 ($T_o$) and the temperature of the liquid coolant at the inlet side of the evaporator coil ($T_i$). This temperature differential is taken as an acceptable approximation of the true superheat for the system, particularly on evaporator coils having a low pressure drop from inlet to outlet.

The fluid exits from the expansion valve 38 into the inlet line 40 of evaporator coil 44 as a two-stage mixture of liquid and gas. While this fluid into the evaporator coil 44 contains gas bubbles, it is primarily in liquid form. As the mixture then flows through the evaporator coil 44, it is in a heat exchange relationship with the compartment or unit 14 to be cooled. Air is generally blown across the evaporator coil by a fan 16 to perform the heat exchange operation between the cooled evaporator coils and the air flowing thereover. Hence, heat is transferred from the compartment to the refrigerant flowing through the evaporator coil, causing the liquid to boil. In normal operations, the refrigerant in the evaportor coil 44 assumes a superheated gaseous state by the time it exits at the outlet 46 of the evaporator coil 44. The refrigerant gas is then passed through the suction line 46 to the compressor 30, where the cycle is again initiated with the compression of the refrigerant gas.

In a closed loop control system, the expansion valve 38 is commonly operated in response to the superheat temperature ($T_{sh} = T_o - T_i$) in the suction line 46 to the compressor. Such a control device attempts to maintain a constant superheat condition in the fluid leaving the evaporator coil 44. Should any liquid still be included in the refrigerant gas as it enters the compressor 30, the compressor will not operate properly and will, in time, most likely be damaged.

As the liquid refrigerant passes through the expansion valve 38 into the inlet line 40 to the evaporator coil 44, the refrigerant encounters a lower pressure on the downstream side of the expansion valve than is present on the liquid line 36. This pressure differential causes the liquid refrigerant to boil, evaporate and thus absorb heat.

In accordance with the present invention, the expansion valve 38, shown in FIG. 1, is an electrically-actuated solenoid flow control valve which is controlled from the expansion valve control circuit 10.

Various temperatures within the air conditioning system are detected by the expansion valve control circuit 10 to produce a control signal on line 7 to the solenoid expansion valve 38. For example, an inlet temperature sensor 52 is positioned proximal the downstream side of the solenoid expansion valve 38 to sense the temperature $T_i$ of the liquid refrigerant as it leaves the expansion valve. An outlet temperature sensor 54 is positioned at the outlet end of the evaporator coil 44 to detect the temperature $T_o$ of the superheated gaseous refrigerant as it leaves the evaporator coil 44.

Additional temperature sensor units are provided for system control functions which include both the start-up condition and certain fail safe conditions for system safety. For example, a temperature sensor 36 is positioned proximal the solenoid expansion valve 38 on the upstream side thereof to monitor the temperature of the liquid refrigerant as it enters the expansion valve 38. Sensor 36 is functionally obtained to provide control for low ambient start up conditions for the system.

An air temperature sensor 12 is positioned in the return air from the cooled unit 14 to determine the amount of cooling provided. Such air temperature detection is applied to the expansion valve control circuit 10 to effect temperature type control when the air temperature exceeds a low temperature setting. In other words, if the return air from the unit being cooled drops below a preset desired limit, the expansion valve control circuit 10 operates to throttle down the refrigerant flow to permit the temperature within the unit cooled to rise above this lower threshold value. When the temperature is again within an acceptable range, the control circuit 10 is permitted to continue operations at the point where the circuit was operating when the temperature controlled shutdown function was initiated.

Turning now to FIG. 2, there is illustrated a control response curve for a typical prior-art expansion valve as used in a closed vapor cycle refrigeration system. Typically, such control response presented a linear relationship between the superheat of the gaseous vapor and orifice opening size through which the liquid coolant flows, expressed as a percentage of full open fluid flow through the expansion valve 38 orifice. In such a system, for example, the demand for fluid refrigerant into the evaporator coil 44 to achieve a desired temperature cooling could fluctuate from as little as 30% of maximum capacity, representing a demand condition A, to 60% of maximum at a second demand condition B. For the lower demand condition A, a set point A control norm would obtain where short term variations in demand about the set point A would occur in order to maintain, on the average, the particular flow rate through the expansion valve 38 representing a 30% opening condition. As demand increases, the set point shifts in response to the increase in demand.

For the 60% flow capacity through the expansion valve 38, a second set point B would obtain. Short term demand variations about the set point B would obtain in a similar manner as occurs for any demand condition for the system, including set point A. However, for the control response relationship as illustrated in FIG. 2, a unit change in superheat about set point A will result in some change in the flow rate about the 30% position. Because of the linear relationship, the same unit change in superheat about set point B for the 60% demand condition will produce the identical change in flow rate. Expressed as a percentage change, the change in flow rate for demand condition A in response to the unit change in superheat will be substantially greater than the percentage change that same flow rate change represents if it were to occur about the set point B. In other words, at higher flow rate demand conditions, a given unit change in superheat does not produce as great a percentage change in the flow rate. An air conditioning system having an expansion valve with the control response as shown in FIG. 2 cannot respond to changing superheat conditions at higher demand flow rates with the same sensitivity that the system responds to at the lower flow rate. Accordingly, at higher flow rates, a greater change in the superheat is required in order to effect the same percentage change in the flow rate as occurs at lower rates. In accordance with the present invention, these and other limitations of the prior-art control valves have been eliminated.

Turning now to FIG. 3A, there is graphically illustrated the control response curve in accordance with the present invention for the closed loop control system as illustrated in FIG. 1. Not only has the present invention eliminated a shifting of the set points in response to a change in the demand rate of the refrigerant fluid through the evaporator 44, but it provides for a constant percentage change in the flow rate for a given unit change in superheat regardless of the flow rate condition or demand condition on the air conditioning system.

In accordance with the present invention, the control response curve for the expansion valve 38 is not linear, but is represented as an exponential function. The expression for the control response curve may be represented as a single exponential term whose exponent is a function of the gaseous vapor superheat ($T_{sh}$), and includes a second DC offset term which is a function of the integral of the difference between the desired operating set point superheat condition ($T_{sp}$) and the instantaneous superheat which is occurring within the system ($T_{sh}$). With this DC term, if the superheat deviates from the set point for any appreciable time, the response control function curve is, in effect, shifted by the integral term to the left in FIG. 3A. The control response curve is shifted an amount necessary to bring the system to a condition in which the system responds to a unit change in superheat with the same percentage change in flow rate regardless of what flow rate condition is present through the expansion valve 38.

In this manner, a single set point operating condition for the superheat is obtained for all flow rate demands through the expansion valve 38. Thus, a one unit change in superheat at a 30% demand flow condition produces a change in flow rate which, when expressed as a percentage change, is the same as the percentage change in flow rate experienced at a higher demand condition for the same given one unit change in superheat. This constant percentage change is illustrated in FIG. 3A, and results from the exponential nature of the response control function.

The integral offset term in the expression for the control response curve modifies the position of the curve in FIG. 3 so that, in effect, a change in demand moves the operating point up and down the control response curve. In other words, as the demand condition changes, the system operates at a different point on the response control function curve, such as the curve for operating condition A, which has been shifted to the curve for operating condition B maintaining the single set point operating point.

While the preferred embodiment of the present invention uses the exponential relationship between the superheat and the percent of full open capacity for the expansion valve 38, it is possible to utilize the linear relationship which is typically found in the prior-art control systems (See FIG. 2) to attain some of the advantages of the present invention, such as a single set point operating condition. However, for such a linear relationship, some of the disadvantages present in the prior art will still be present in this alternate embodiment. That is, the given one unit change in superheat will produce a different percentage change in the flow rate as a function of the particular demand condition which is occurring, but as below disclosed, other advantages for this embodiment can also be obtained.

Figure 4:
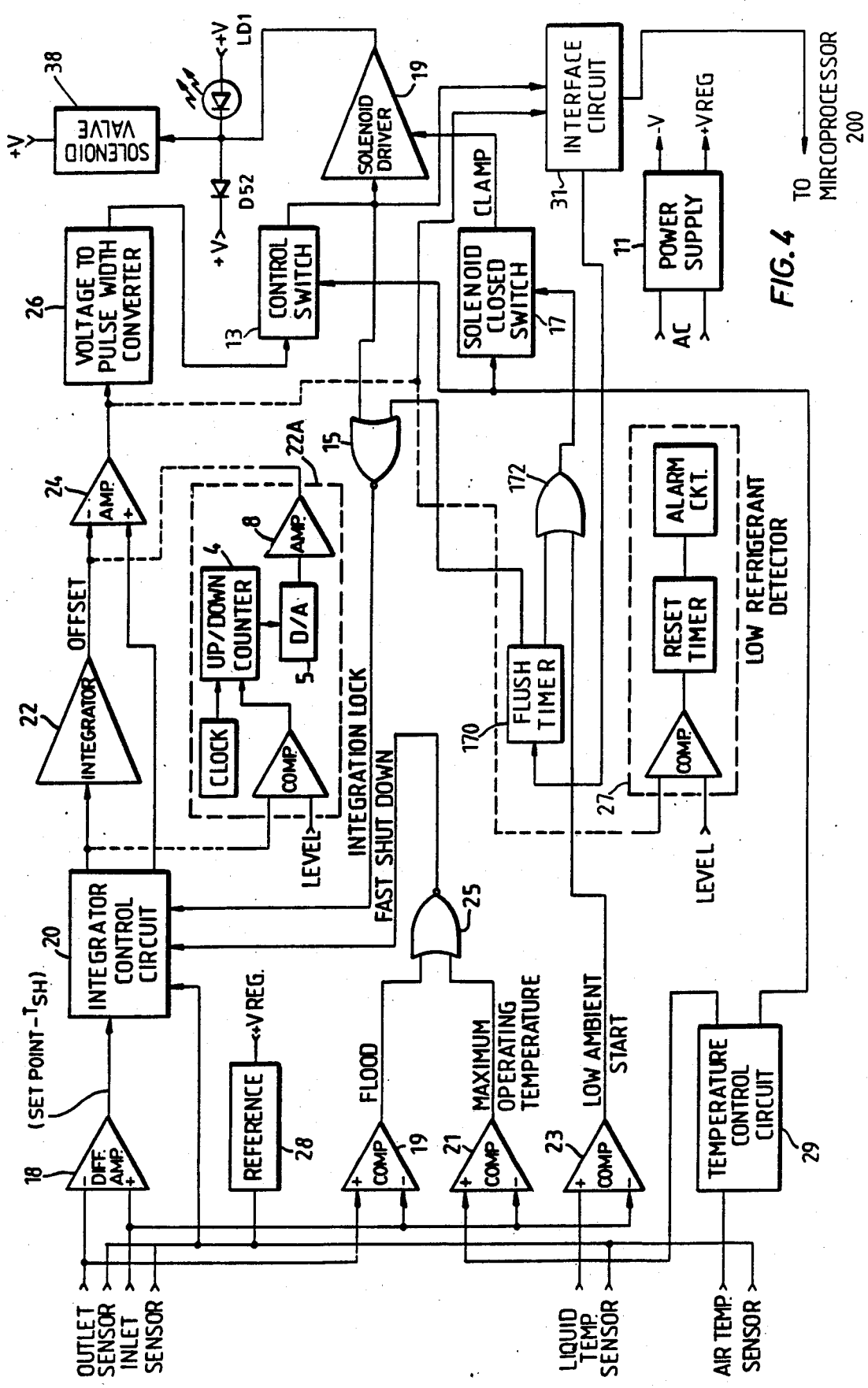
FIG. 4 is a functional block diagram of the expansion valve control circuit 10 illustrated in FIG. 1.

Referring now to FIG. 4 there is shown a functional block diagram of the expansion valve control circuit 10 illustrated in FIG. 1. Control circuit 10 functions to implement the control response curves and operations as illustrated in FIG. 3A. Referring now to both FIGS. 1 and 4, the outputs from inlet sensor 52 and outlet sensor 54 are shown in FIG. 4 inputted to a differential amplifier 18. Differential amplifier 18 generates an output signal which is a function of the difference in the temperature signals ($T_o - T_i$) received from these two sensors to produce a signal representative of a change in the superheat condition for the gaseous vapor. The output from amplifier 18 is inputted into an integrator control circuit 20 which, in turn, produces two outputs control signals. A first output signal from control circuit 20 is applied to one input of a second amplifier 24, while a second output signal is inputted to an integrator 22. The output from the integrator 22 is applied as an offset voltage to a second input of the second amplifier 24. Amplifier 24 produces an output control signal which is applied to a function generator 26 and to interface circuit 31 which provides the interface between an external controller, such as microprocessor 200 (see FIGS. 9–10) and the expansion valve controller circuit 10.

For the preferred embodiment of the present invention, function generator 26 is a voltage-to-pulse width converter, i.e., a pulse width modulator. The output from the pulse width modulator 26 is applied to the solenoid valve 38 to control the desired flow condition through the expansion valve 38, and to interface circuit 31 to enable microprocessor 200 to sample either the analog voltage representative of the flow rate through valve 38, or to obtain a measure of the duty cycle of the solenoid control signal which also is indicative of the flow rate.

The integrator control circuit 20, integrator 22, amplifier 24, and voltage-to-pulse width converter 26 each cooperate together to implement the exponential control response curves as shown in FIG. 3A. Primarily, the exponential term for the control response curve is achieved from the transfer function of the voltage-to-pulse width converter 26. The input control voltage to the voltage-to-pulse width converter 26 outputted by amplifier 24 is controlled by the integrator control circuit 20 and integrator 22 to generate the integral component of the exponential exponent for the control response curve. That is, the voltage on the output of the differential amplifier 18 is a voltage representing a change in the instantaneous superheat for the coolant gas at the outlet side of evaporator 44. If a set point superheat operating condition of, for example, 4° F. superheat has been selected, the voltage on the output of amplifier 18 would represent the change in superheat from this set point, e.g., 4° F.$-T_{sh}$.

This superheat change voltage is applied to the integrator 22 and is integrated over time to produce an output DC offset voltage for amplifier 24. The integrator control circuit 20 also applies the output of the differential amplifier 18 directly to the input of amplifier 24. This direct connection of the output of the differential amplifier 18 to the amplifier 24 enables the expansion valve control circuit 10 to respond instantaneously to short term variations in the superheat about the set point. Only long term deviations from the set point superheat are reflected as control changes in the output of amplifier 24 as a result of the integration process through the integrator 22. These long term steady-state changes in the superheat from the set point represent a changed demand condition which require a shifting of the control response curve. As previously mentioned, this integration process effectively shifts the response control curve in a direction to enable the air conditioning system to effectively operate at a single superheat set point condition regardless of the demand conditions through the expansion valve 38.

Figure 5A:
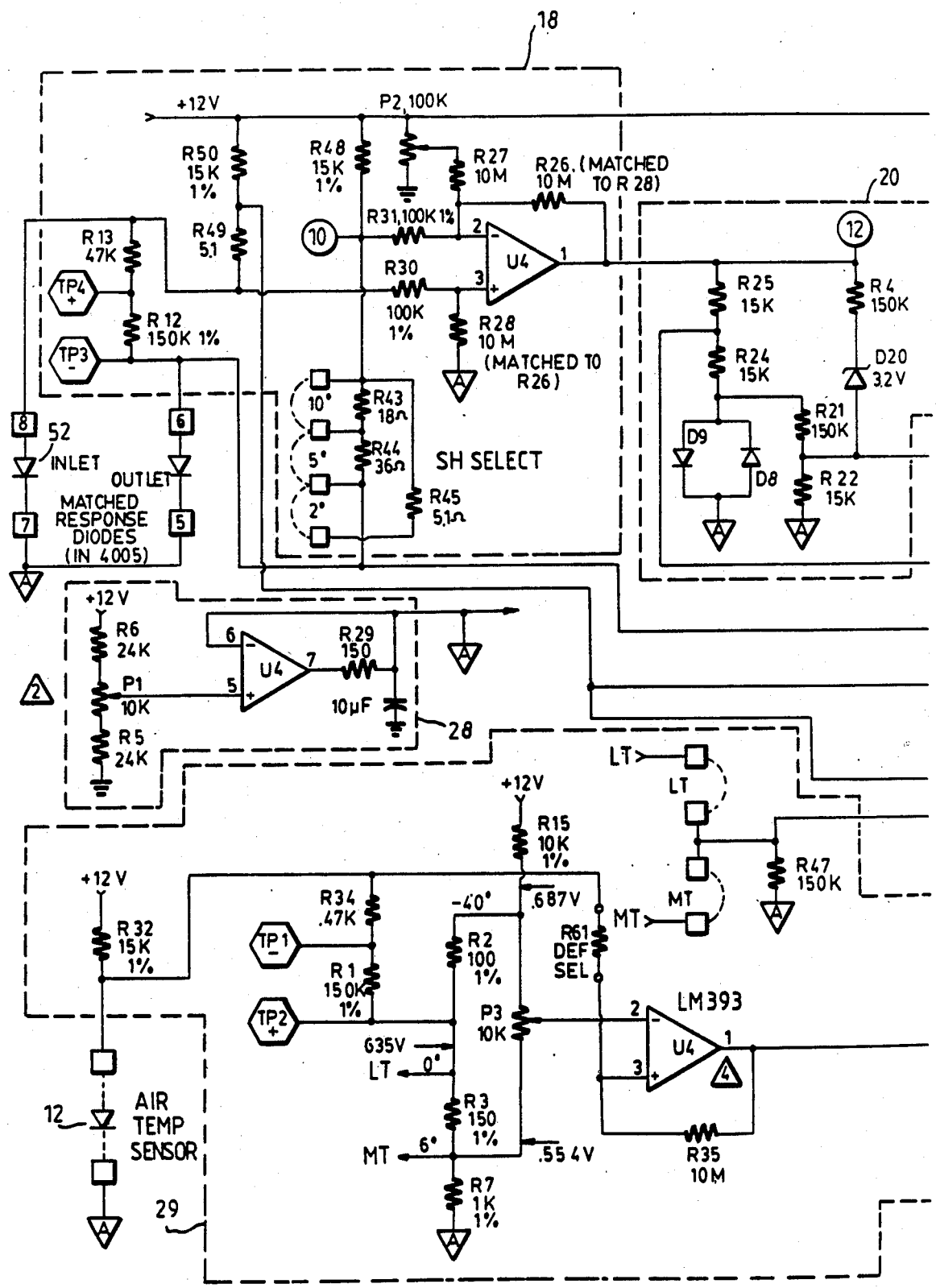
FIGS. 5A, 5B, and 5C, together comprise a detailed circuit diagram of the expansion valve control circuit 10 when
Figure 5B:
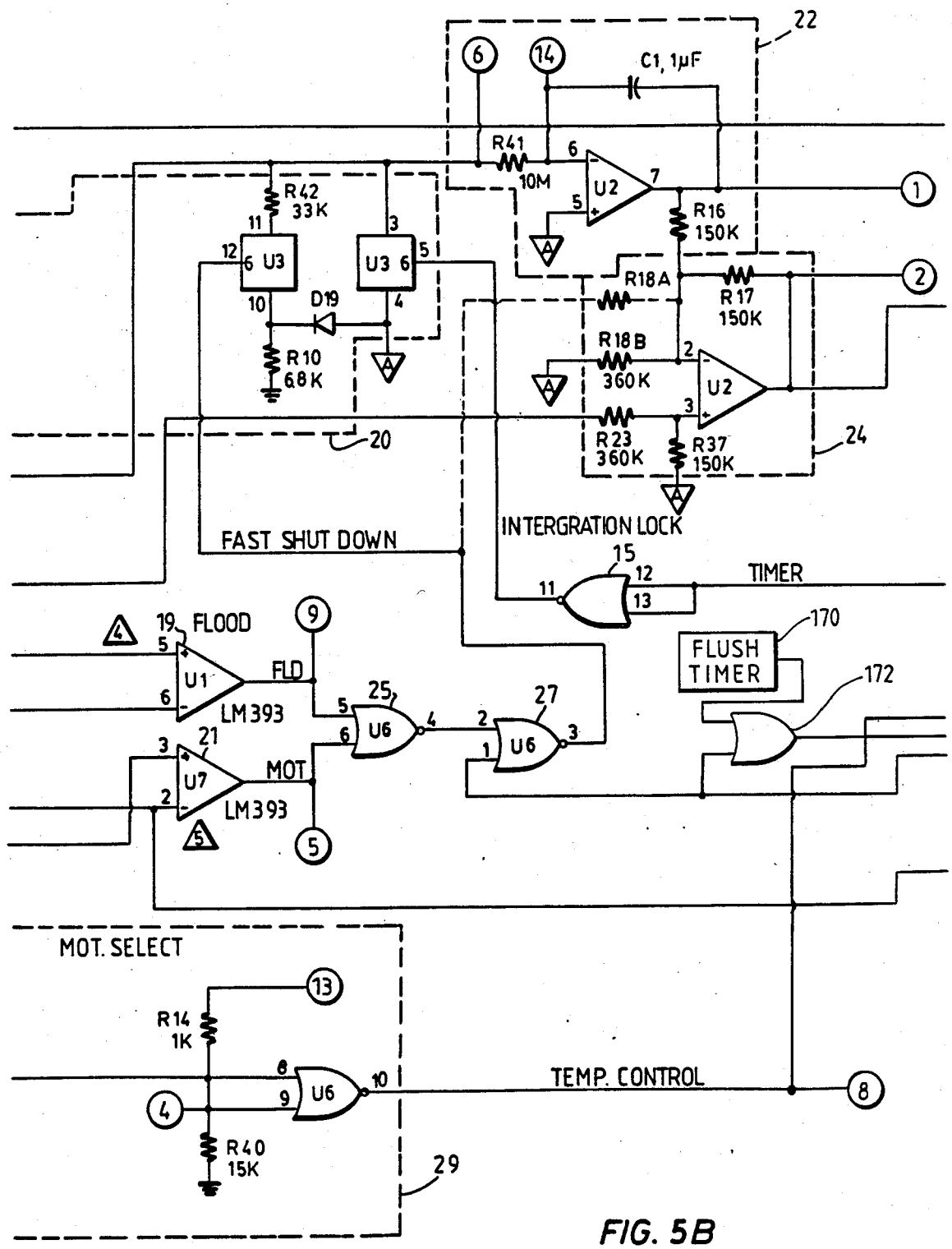

As described below and as shown in FIG. 5B, the integrator 22 function is performed solely by analog circuits in the nature of an operation amplifier having associated resistors and capacitors connected in a well-known integrator configuration. While an analog embodiment of an integrator is disclosed, other equivalent embodiments may be used. For example, a digital circuit implementation 6 of an integrator (shown in FIG. 4 in dashed lines) could just as easily be substituted for the analog embodiment shown. A well-known digital circuit for an integrator consists of up/down counter 4 whose count represents the integration value of an input voltage.

A count direction control signal is generated as a function of the difference between a set point superheat and the operating superheat of the system. If the operating superheat is above the set point by some predetermined amount, the count direction signal will permit the count in the up/down counter 4 to be increased by one count at a clock time determined from clock 3. If below the set point, the count is decreased one count at the clock time. The period of the clocking signal determines the integrator time constant for the digital integrator.

To obtain an analog voltage as a function of the count, a digital-to-analog (D/A) converter 5 is provided. The output from the D/A 5 can be further processed to obtain the offset voltage needed by amplifier 24 to adjust the response control curve to a changed flow rate condition.

Still referring to FIG. 4, the output from the voltage-to-pulse width converter 26 is applied to the input of a control switch 13, which in turn applies the output from converter 26 to the input of the solenoid driver 19 when the control switch 13 is closed. The solenoid driver 19 output is applied directly to the solenoid of the solenoid valve 38 to electrically actuate the setting of the flow condition through the valve.

Additionally referring now to FIG. 6, there is shown a timing diagram for the output voltage waveform for the voltage-to-pulse width converter 26 as shown in FIG. 4. The timing waveform illustrated in FIG. 6 are intended to represent the two operating conditions A and B as shown in FIG. 3A. The frequency of the pulse train shown in FIG. 6 is constant regardless of system flow rate demand conditions, and for the preferred embodiment, this frequency is set for a period of seven seconds. The duty cycle of each period of the waveform is controlled to effectuate a desired flow condition through the expansion valve 38. When the waveform in FIG. 6 is in a first logic state, a full open flow condition through the solenoid valve 38 is obtained. The opposite logic state produces a fully closed orifice permitting no flow of liquid refrigerant through the valve. By varying the duty cycle of the pulse width modulated waveform, the average flow rate through the expansion valve 38 can be precisely controlled. The frequency of the pulsed waveform is selected to be high enough so that the slow response time of evaporator 44 effectively filters out the flow—no flow pulsations of the fluid, but low enough that the solenoid can respond to the opening and closing commands to the valve's orifice.

One of the significant disadvantages of prior art expansion valves, whether mechanical or electromechanical, is the phenomenon known as hysteresis. Hysteresis results in an error in the exact orifice opening size in response to a given control signal. For a typical prior art mechanical expansion valve, a 6° F. superheat hysteresis error is not uncommon. This superheat hysteresis error means that a change in the superheat conditions must exceed 6° F. before any change in the flow condition through the expansion valve 38 will be affected.

In accordance with the present invention, it is possible to eliminate this hysteresis effect. Hysteresis errors are eliminated by the oscillatory energization of the solenoid valve 38 to effectuate movement of the orifice closing mechanism between a first position represented by a maximum control voltage to a second position represented by a minimum control voltage to the solenoid valve 38. If the control voltage to the solenoid valve 38 is caused to oscillate at a frequency within the response range of the solenoid valve 38 and greater in magnitude than the hysteresis error, the hysteresis errors are averaged out so that, on the average, the position of the orifice closing mechanism will be in the desired position to achieve the desired flow rate therethrough. In other words, if the control signal which effects movement of the orifice closing mechanism is greater than the hysteresis error band and produces movement of the orifice closing mechanism, the long term averaging of the orifice opening will be equal to the size predicted by the average value of the control signal, i.e., the desired average flow rate would be represented by the average value of the solenoid control signal.

Movement of the orifice opening mechanism, however, is not necessary to eliminate hysteresis error. For example, if the magnitude of the oscillatory component is nearly equal to the hysteresis error so that the solenoid plunger does not move, any change in solenoid control signal will be reflected as an accurate movement of the plunger because the hysteresis error component will have already been accounted for by the oscillator component of the solenoid control signal.

The pulsed waveform illustrated in FIG. 6 illustrates a digital square wave control signal to the solenoid valve 38 in which the orifice closing mechanism is moved from a first position (logic state one represented by a maximum control voltage) in which the orifice is wide open to a second position (logic state two represented by the minimum control voltage) in which the orifice is fully closed. For the two control voltage extremes illustrated for the waveform in FIG. 6, the control signal is represented as an oscillatory waveform which obtains a movement from a fully open to a fully closed position.

It will be obvious to a person of ordinary skill that rather than causing movement of the orifice closing mechanism to move from a fully open to a fully closed position, it is possible to have the control signal have a smaller amplitude as well as be characterized by either a sinusoidal waveform or a squarewave waveform superimposed on a DC component to achieve the oscillatory movement of the orifice closing mechanism (or not) between two positions about some average desired open position. In other words, movement does not have to be from a fully open to a fully closed position in order to eliminate the hysteresis error effect which is inherent in the mechanical design of solenoid expansion valves. Thus, in accordance with the principals of the present invention, it is possible to achieve a very accurate control of the orifice opening, on the average, by providing an oscillatory excitation to the solenoid control valve 38.

Even though the waveform illustrated in FIG. 6 for the control signal to the solenoid valve 38 represents a maximum movement of the orifice closing mechanism, the averaging effect of the hysteresis error is also obtained. The duty cycle of the pulse width modulated waveform determines the average flow through the orifice, which could be represented as an average position for the closing mechanism to achieve that desired average flow rate. Thus, for operating condition A, the duty cycle of the time the orifice is fully open to the time that it is fully closed produces one flow rate while the duty cycle for operating condition B shows an open time which is greater thereby representing a higher demand flow condition through the solenoid valve 38.

Still referring to FIG. 6, it should be noted that the pulse width modulated waveform shown therein is represented by leading and trailing edges which are sloping in nature as opposed to an instantaneous voltage change characteristic of pulse width modulated waveforms. One of the significant problems which occurs in a close vapor cycle refrigeration system when a valve, such as the electrically-actuated solenoid expansion valve 38 of the present invention, is abruptly opened or closed to the fluid flow therethrough is a pressure shock wave phenomenon which is generated in a liquid refrigerant. This pressure shock wave occurs when the time rate of change in pressure is affected in the expansion valve 38, i.e., the dp/dt term is high. Prior-art solenoid valves are especially bad at producing this shock wave because of the nonlinear forces which act on the orifice closing mechanism at the moment of opening and closing to produce rapid movement, and accordingly, large dp/dt values.

The effects of this pressure shock wave on the system are severe, especially in view of the large number of openings and closings of the solenoid valve which must occur over the life of the valve. It has been found that such pressure shock waves eventually render the air conditioning system inoperative due to damage to the various elements which together comprise the closed vapor loop system.

The present invention has solved this problem by controlling the dp/dt condition is going from full flow to zero flow by ramping up and down the control signal to the solenoid valve 38 in a controlled manner. This slowing down of the speed with which openings and closings occur minimizes the time rate of change of the pressure condition at the orifice of the valve 38. The opening time represented by the ramp condition on the pulse width modulated waveform controllably moves the orifice closing mechanism between the two positions representing the full open and fully closed position. In this manner, the undesirable pressure shock wave in the refrigerant coolant is essentially eliminated.

In addition to the controlling of the openings and closings of valve 38 by the ramp time of the pulse width modulated waveform from converter 26 to minimize pressure impulses in the system, some measure of filtering of these impulses can be achieved by the use of line restrictions ahead of and behind expansion valve 38. For example, FIG. 1 illustrates these restrictions as line restrictions 71 and 73, respectively. (Such restrictions could just as easily be incorporated into expansion valve 38.) Two types of restrictions have been found to improve the filtering of these impulses, one type which is a simple restriction in the diameter of the line to a more complex type which monitors the flow therethrough and modulates the restriction as a function of the pressure drop there-across to obtain a constant flow rate. This latter constant flow control device tends to eliminate variations in flow rate due to pressure changes across the restriction.

Referring once again to FIG. 4, there is shown additional control functions which regulate extreme conditions encountered during start up and normal operations for the refrigeration system shown in FIG. 1. As shown in FIG. 1, a temperature sensor 70 is placed on the liquid line 36 for purposes of determining a low ambient start condition. This liquid temperature sensor 70 is inputted to a comparator 23 which compares the temperature difference between the temperature of the upstream side refrigerant coolant to the temperature on the downstream side from inlet sensor 52. If the two temperatures are essentially the same, a LOW AMBIENT START control signal is generated to actuate the solenoid close switch 17 via OR gate 172. When the temperatures on the upstream and downstream side of the solenoid expansion valve are essentially the same, as would be present for a low ambient start condition, gas is essentially present in the liquid line 36 and no expansion is occurring across the expansion valve 38.

The output from the solenoid close switch 17 is applied as a clamping voltage to the solenoid driver 19 thereby to actuate the driver to open the solenoid valve 38 to its full open position. If the LOW AMBIENT START signal is active, the valve 38 is held open permitting fluid to flow when such fluid is present.

The LOW AMBIENT START control signal is continuously generated to keep the solenoid valve 38 fully open as the system starts up. Eventually, liquid refrigerant will enter the solenoid valve 38 and experience some expansion thereby to create a temperature differential across the solenoid valve representing a condition at which the control system should then begin to operate. Under this condition, the comparator 28 removes the LOW AMBIENT START signal thereby removing the clamp voltage to the solenoid driver 19. To insure that the system will start on power up (0° superheat) even if a low ambient start condition is not present, the circuit of the valve control circuit 10 are designed to produce a minimum pulsed duty cycle control signal to the expansion valve 38 of 10%. With this minimum duty cycle, the expansion valve 38 will at least be open some of the time to permit fluid to enter the evaporator coil 44.

In accordance with one aspect of the invention, there is provided in the expansion valve control 10 shown in FIG. 4 a means for effecting the synchronized control of the expansion valve 38 to cause a "flushing" of the evaporator coil(s) associated with the expansion valve 38 shown in FIG. 4. (See, for example, the refrigeration system shown in FIG. 11, which illustrates a system having plural compressors, plural evaporator coils and plural solenoid expansion valves 38.) Lubricating oil for the compressor(s) in a refrigeration system often become mixed with the liquid refrigerant and are transported to the evaporator coil(s). Since the liquid refrigerant changes to a gaseous phase therein, transportation becomes less efficient and there tends to be a buildup of oil, i.e., a logging of oil, in the coils.

To prevent such buildup or logging of oil in the evaporator coils, the present invention has provided for circuits in the solenoid control 10 which, responsive to control from an external controller, generates a time interval during which the solenoid valve 38 is fully opened to permit maximum flow therethrough. The valve is held open for a predetermined time period to permit liquid refrigerant to nearly fill the evaporator coil and collect the oil accumulated and carry or push out the other end. The time interval is chosen to permit the maximum amount of liquid refrigerant to enter the evaporator coil without causing liquid refrigerant to come out the other end.

While it is not absolutely necessary, it may be desirable to generate an INTEGRATION LOCK signal to the input of the integrator (as described below) to prevent the control system from reacting to the extraordinary operating condition which is generated during a flush cycle.

Still referring to FIG. 4, interface circuit 31 responds to microprocessor 200 to generate a trigger signal to flush timer 170. Timer 170 generates a determined time interval during which the timer 170 controls solenoid switch 17 via OR gate 172 to fully open valve 38, and to clamp the input of integrator 22 to zero via NOR gate 15 to prevent any further change in the offset voltage to amplifier 24. At the completion of the flush time, the flush timer 170 returns normal control over to the pulse width on-off modulator 26. While not shown in FIG. 4, it would also be possible to close valve 38 prior to a flush cycle to permit the compressors to evacuate the evaporator coils prior to opening the valve for full flow.

Because microprocessor 200 can measure the flow rate of valve 38, it may be desirable to provide flush timer 170 with a programmable count indicative of the flush fill time interval rather than providing fixed interval. Depending upon the flow rate at the time for a flush cycle, the time during which the valve may be held open to fill but not overfill may vary. Such a variation on the circuit shown in FIG. 4 would be easily implemented. It is also possible to implement the flush timer 170 timing function in the software of microprocessor 200. The microprocessor 200 could measure operating conditions, determine the proper flush cycle time interval for the valve, implement the time interval by controlling the valve via interface circuit 31 to open until the time interval is complete. Additionally, the functionality of the analog and digital circuits shown in FIG. 4 could just as easily be replaced by a general purpose microprocessor programmed to perform the same functions on the same input signals to obtain the desired output control signals.

During normal operations, several additional system conditions can occur which require gross control to the solenoid expansion valve 38. For example, a flooding condition can occur in which the temperature sensor at the outlet side of the evaporator coil 44 senses that a superheated gas is not coming out of the evaporator coil, liquid refrigerant is also present. Liquid in the suction side of compressor 30 is a dangerous operating condition for the compressor. This is referred to as a FLOOD condition, and is indicated when the temperature differential between $T_o$ and $T_i$ is essentially zero.

Comparator 19 responds to the temperature differential between the inlet sensor 52 and the outlet sensor 54 to generate a FLOOD control signal when $T_o - T_i$ is zero. This signal is applied as one input to NOR gate 25. The output from NOR gate 25 is the signal FAST SHUT DOWN, which is inputted to the integrator control circuit 20 to effectively throttle down the control operation to the expansion valve 38 to lessen the amount of liquid refrigerant being injected into the evaporator coil 44. This throttling operation is achieved by injecting a voltage into the integrator 22 which represents a lower demand condition thereby resulting in a decrease in the flow rate through the expansion valve 38.

In a similar manner, it is desired to limit the lower operating temperature for the refrigerant coolant through the compressor 30 in order to avoid damage to the compressor. The inlet temperature from inlet sensor 52 is applied to a comparator 21 which compares the inlet temperature to a maximum lower operating temperature setting also applied to the comparator 21. When the inlet temperature drops below the maximum lower operating temperature setting the comparator 21 outputs a logic control signal to the second input of the NOR gate 25 to also generate the signal FAST SHUT DOWN, and thereby obtain the same throttling operation as previously described.

Finally, an air temperature sensor 12 is provided to sense the temperature of the return air, or the ambient air conditions at any place within the system that is desirable to be controlled. This sensor is inputted to a temperature control circuit 29 which generates an output control signal when the refrigerated air temperature exceeds a preset threshold. The output from the temperature control circuit 29 is applied as a control signal to control the condition of the control switch 13 and as the input voltage applied through the solenoid closed switch 17 when a LOW AMBIENT START condition is present. When monitoring the return air temperature, if the ambient air temperature exceeds a lower threshold value, the control switch 13 is opened removing the signal from the voltage-to-pulse width converter 26 from the input of the solenoid driver 19. Removing the converter 26 output closes the solenoid expansion valve 38 and prohibits further flow of the liquid refrigerant into the expansion coil 44. At the same time, the output of the control switch 13 causes the NOR gate 15 to generate the signal INTEGRATION LOCK which is applied to the integrator control circuit 20. INTEGRATOR LOCK prevents the integrator 22 from changing the offset voltage on its output from the condition which is present at the time control switch 13 is opened. This in effect takes a snapshot picture of the conditions of the control circuits at the moment that the ambient temperature signal caused the system to be shut down so that when the ambient air condition is again in an acceptable range, the system can pick up from the point at which it was operating when the temperature exceeded the threshold.

Figure 5C:
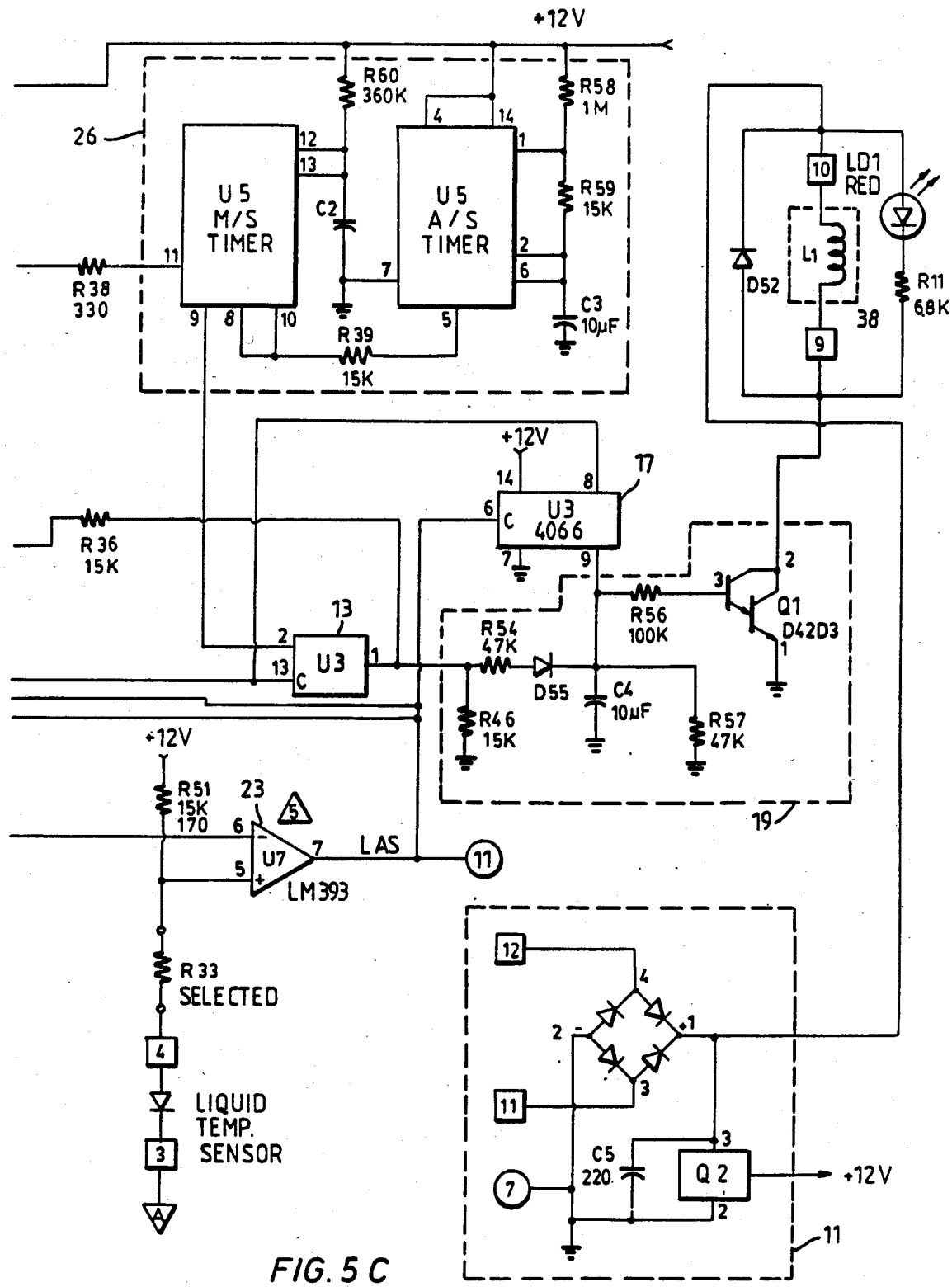

Turning now to FIGS. 5A, 5B and 5C, there is illustrated a detailed circuit diagram of the expansion valve control circuit 10 as illustrated in FIG. 4, when FIG. 5C is placed to the right of FIG. 5B and FIG. 5A is placed to the left of FIG. 5B. Each of the functional blocks illustrated in FIG. 4 are shown in FIG. 5. The operations of the integrated circuits illustrated in FIGS. 5A, 5B and 5C are well known to those of ordinary skill in the art, and accordingly, a detailed description of their operation will not be provided. However, additional features not previously discussed are illustrated in the detailed circuit diagram. For example, if the difference between the inlet temperature and outlet temperature exceeds a maximum threshold, the integrator control circuit 20 itself produces a gross system correction to bring the temperature differential back within an acceptable operating range. Resistor R4 in series with Zenor diode D20 responds to the voltage representing the difference between the set point and the instantaneous superheat temperature for the outlet temperature. If that voltage exceeds some maximum temperature differential, for example 32° F. superheat, the Zenor diode D20 will conduct and apply a voltage to the input of the integrator 22 to produce a rapid change in the offset voltage into the amplifier 24. This rapid change in offset throttles the system down to a situation represented by a low demand condition thereby causing the temperature differential between the inlet and outlet of the expansion coil 44 to decrease. Additionally, the back-to-back diodes D8 and D9 limit the normal voltage range into the control circuit to thereby limit the maximum detectable change in superheat to which the control circuit will respond. Changes in superheat which exceed the limiting voltage of the diodes but are less than the maximum superheat which trips Zener diode D20 result in a constant change in control as determined by the limiting action of diodes D8 and D9. Changes in superheat which are below the limiting range of diodes D8 and D9 effect a change in control or a function of the magnitude of the change.

As shown in both FIGS. 4 and 5C, a light emitting diode LD1 is connected to the output of the solenoid driver 19 thereby to indicate the amount of time that the solenoid valve 38 is open. As the demand condition increases, the intensity of light emitted by the diode LD1 increases thereby indicating an increase in the demand of the system. An indication by LD1 that the solenoid valve is operating in a high demand capacity is indicative of a low refrigerant condition within the system. As shown in FIG. 4, an alternate low refrigerant detector 27 could be incorporated into the circuits for the expansion valve control circuit 10 whereby the output from the amplifier 24 would be compared with a preset level condition to indicate a condition in which the duty cycle for the pulse width modulated signal is higher than some preset condition for some predetermined time interval. The output from the comparison of these signals could be used to generate an alarm signal indicating the lack of refrigerant condition. This feature could also be accomplished by monitoring the superheat signal, and if it remains above a predetermined value for a given amount of time, an alarm is indicated.

Figure 9:
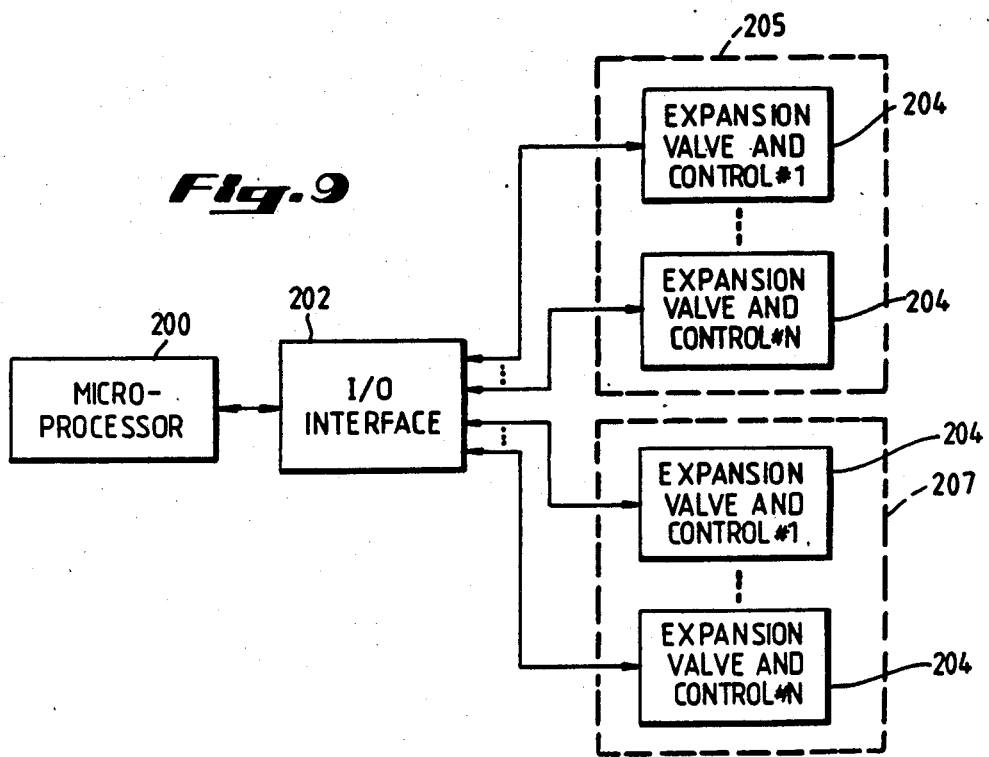
FIG. 9 is a functional block diagram of a refrigeration control system including a microprocessor connected to a plurality of solenoid controlled expansion valves for monitoring performance of such valves.

Instead of providing detection of the flow rate of the expansion valve 38 and indicating a low refrigerant condition locally at the valve, information about the operating condition for the expansion valve and its associated refrigeration system could be forwarded to a remote processing station for more expanded monitoring and control. FIG. 9 illustrates a system for performing such a remote monitoring and processing of the operating conditions for the expansion valves of several refrigeration systems.

Referring to FIG. 9 there is illustrated a system by which each solenoid valve 38 and its associated control circuit 10 communicate valve performance data to a centrally located microprocessor 200. The physical location of microprocessor 200 to the valves is not critical, for example, a large main frame computer located far away or even a specially designed hardware controller circuit located proximal the valves would also be possible. Communication links between the valves 38 and associated control circuits 10 and the microprocessor 200 for the transmission of data therebetween could be any of the well known means of communicating digital or analog signals. Communication links to couple data from the valves to such a remote computer are thus well known in the art.

It is therefore possible to transmit information such as the flow rate condition in a solenoid expansion valve 38 (the output from amplifier 24 shown in FIG. 4, for example, is indicative of the desired flow rate condition of valve 38) from a remote location to a central processing means for analysis and feedback control. In addition to the flow rate condition, other refrigeration system parameters could also be transmitted, for example, the refrigeration system suction line pressure, the superheat temperature readings of each of the evaporator coils in the system as well as the temperature of the area cooled by each evaporator, etc. With such information available from all the solenoid expansion valves, it is possible to monitor overall refrigerator system performance, such as to determine the average flow rate condition to each fixture in a given refrigeration system and then to compare each valve's flow rate to that average. A higher deviation from the average is indicative of a greater energy input to the fixture, but such a higher deviation might also be indicative of a problem with the fixture.

Figure 10:
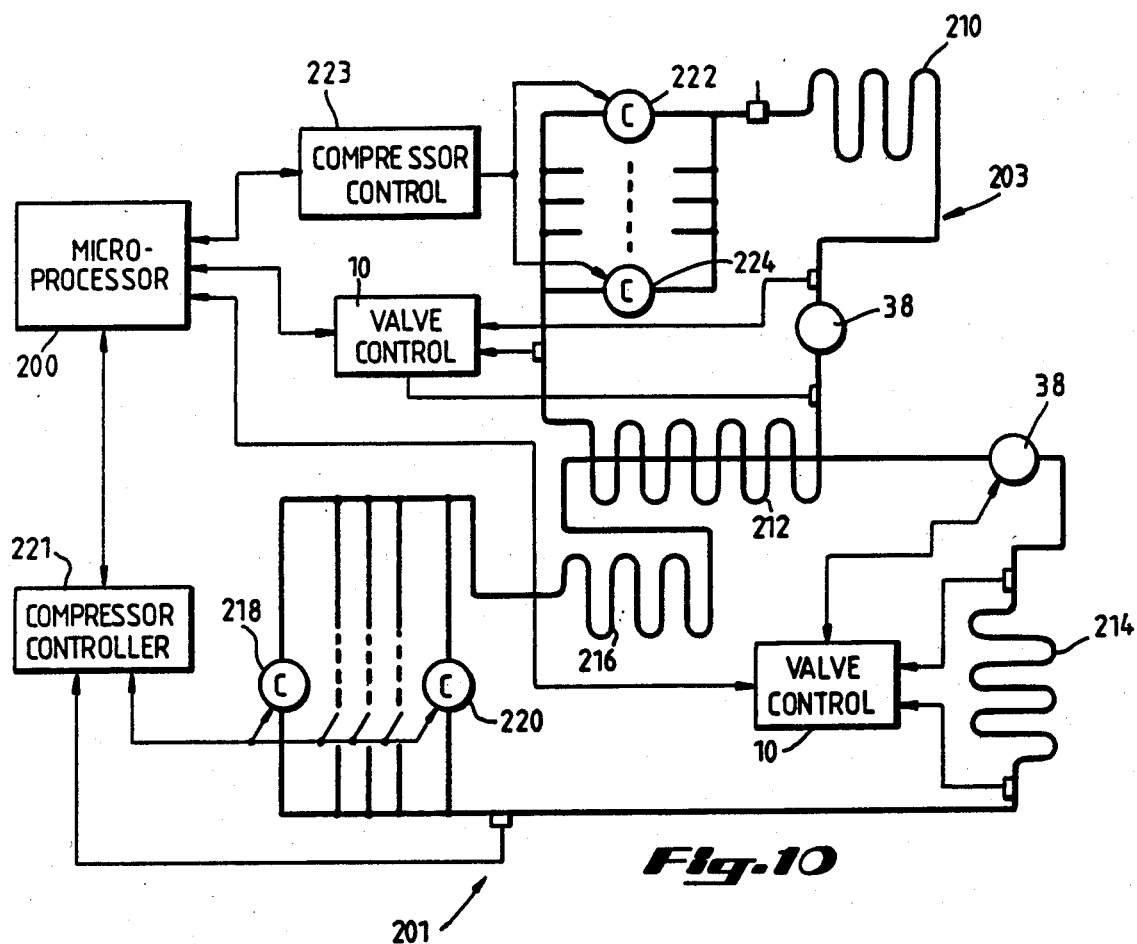
FIG. 10 is a functional block diagram of a low temperature refrigeration system having a microprocessor for controlling the system compressor capacity in a low temperature refrigeration system and for controlling the amount of subcooling provided by a high temperature refrigeration system incorporating a solenoid expansion valve.

Other control functions for the microprocessor 200 are possible when system parameter information is available for processing. Consider, for example, FIG. 10 which illustrates a configuration of refrigeration systems where a low temperature refrigeration system 201 is operating with subcooling of the liquid refrigerant being provided by a second high temperature refrigeration system 203. System 203 incorporates a solenoid expansion valve 38 operated in accordance with the above-described principles. System 201 could just as easily be equipped with one or more of the solenoid valves 38 as is shown in FIG. 10. Both systems shown in FIG. 10 incorporate multiple compressors 218, 220 and 222, 224, for adjusting system compressor capacity, but either of such system could just as easily incorporate a single compressor when the size of the cooling load permits.

Each of the multiple compressors 222, 224 and 218, 220 have associated therewith, respectively, a compressor controller 223 and 221. Such controller circuits 223,221 could be anyone of the controllers disclosed in U.S. patent applications Ser. Nos. 257,113, filed Apr. 24, 1981, 706,403, filed Feb. 27, 1985, or 742,985, filed June 10, 1985. In the case that either refrigeration system 201 or 203 incorporated a single compressor, the associated compressor controller could be that controller disclosed in U.S. Pat. No. 4,537,038. The disclosures of each patent application Ser. Nos. 257,113, 706,408, and 742,985, and the disclosure of U.S. Pat. No. 4,537,038 are incorporated herein by reference for all purposes. It will be obvious to one skilled in the art that the control function of compressor controllers 221 and 223 could just as easily be performed by microprocessor 200.

Subcooling of the liquid refrigerant in the low temperature refrigeration system 201 by a separate refrigeration system results in less total energy required to meet the cooling requirement of evaporator coil 214. By monitoring the system compressor capacity selection in compressor controller 221 for the low temperature refrigeration system 201, it is possible for the microprocessor 200 to provide feedback control to valve control circuit 10 of the high temperature refrigeration system 203 to throttle down the flow rate through its solenoid expansion valve 38. Feedback control from microprocessor 200 for controlling the flow rate through expansion valve 38 is easily affected by generating a control voltage which is inserted into the circuits of valve control circuit 10 to effect a change in the control voltage out of amplifier 24 (see FIG. 4). The control voltage from amplifier 24 determines the duty cycle of the solenoid control signal, and therefore, the average flow rate through the associated expansion valve. Although not shown in FIG. 4, circuits to effect the injection of a control signal from microprocessor 200 are well known to those skilled in the design of analog circuits. For example, the control voltage could be injected into amplifier 24 as a further offset voltage.

A reduced flow rate through valve 38 of the high temperature refrigeration system 203 is desired in the situation where a reduction in the system compressor capacity in the low temperature refrigeration system 201 has occurred, and vice versa for an increase in capacity. Microprocessor 200 will know when such a change has occurred, or in some cases could itself have called for the change. A reduced compressor capacity in system 201 indicates a reduced cooling load and accordingly a need for less subcooling input to the liquid refrigerant from system 203. A reduced capacity in low temperatures system 201 reduces very quickly the heat load to evaporator 212 of the higher temperature system 203. If the flow rate through 203's system is not quickly reduced, then the system might get liquid out the other end. The microprocessor 200 will know of the change in system 201's capacity and can immediately call for a reduced flow through its expansion valve 38.

Turning now to FIG. 11, there is shown a refrigeration system in accordance with the present invention comprising a plurality of compressors 218-220, a plurality of expansion valves 38 and associated evaporator coils 214-215, all connected in a closed loop with condenser coil 216 connected between the compressors 218-220 and the expansion valves 38. Only a single suction line 46 is shown for returning the refrigerant in its gaseous state to the suction end of the compressors. Each of the expansion valves have an associated control unit 10 as described above in FIG. 4. Coupled to each control unit 10 is microprocessor 200 which monitors and controls some of the operations of the expansion valves 38 via their control units. 10.

As mentioned above, one of the significant problems that a refrigeration system, such as that shown in FIG. 11, has is the buildup in the evaporator coils of lubrication oil from the compressors. By providing periodic flush cycles during which an expansion valve 38 is fully opened for maximum flow rate, it is possible to flush out any oil buildup, and because the flushing is done periodically, the buildup is essentially eliminated in the first place. Because microprocessor 200 has access to each control unit 10, it is possible to control the flush cycle for each valve independently, thus causing the flush cycles for each valve 38 to occur individually, in groups, or all at once. Additionally, since the operating parameters of each valve are instantaneously available to the microprocessor 200, it is possible to calculate on a valve-by-valve basis the ideal flush time interval in accordance with the size of the associated evaporator coil, the superheat, the flow rate, etc.

The periodic flushing of the evaporator coils permits the coils to be commonly connected into a single return suction line 46. Prior art systems in most instances required each evaporator coil to be returned individually to a common manifold at the compressors to control the velocities of flow in each evaporator to eliminate velocity variation that can cause a buildup in those coils where the velocity was low. In accordance with the periodic flush cycles of the present invention, the problem does not occur, thus permitting a single suction line return.

Turning now to FIG. 7, a preferred flow control valve in accordance with the present invention is shown in vertical cross-section. Valve body 90 defines generally therein a chamber 92 connected to an inlet port 94 and an outlet port 96. The inlet port is defined by a connection 98 having an externally threaded end 100, which threads are accommodated by the internal threads in the bottom of the valve body. A protection cap 102 is shown screwed over the external threads of the exposed end of the inlet port, which cap would be removed when the port is connected to a suitable line.

Outlet port 96 is generally provided by a valve seat part 104 which is joined into the side of chamber 92 by being screwed into suitable accommodating threads therein. The outlet port by being screwed into the side of the chamber, is therefore normal or perpendicular to the inlet port screwed into the bottom of the chamber and in line with the plunger action described below. A connection fitting 106 is screwed over suitable accommodating threads in seat 104 to hold the seat in position. As with the inlet port, a suitable protection cap 108 is provided over the external threads of the inlet port assembly just described to protect it during shipping. The cap is removed in order to provide connection to a suitable line.

Operating within chamber 92 just defined is a valve closure 110 which operates in a shear relationship to valve seat 104. That is, closure 110 operates by sliding along the face of the seat to open and close the entry to the outlet. Valve closure 110 is biased forward or toward the valve seat by a suitable biasing spring 112 carried in the valve closure block. The tension on spring 92 can be adjusted by a suitable screw which is entered through a suitable opening on the opposite side of the valve closure block from the valve closure itself.

A suitable plunger 114 operates within valve body 90 at the upper end thereof so as to operate within an upward extending portion of the body which surrounds the plunger and a suitable slide assembly sleeve 116 which is located adjacent to the internal periphery surface of the upwardly extending portion of the body and is, hence, around and adjacent the plunger itself. The material of this slide assembly is preferably Teflon or some other suitable material with low friction properties to permit easy movement of the plunger within the slide assembly.

The bottom portion of plunger 114 is provided with suitable internal threads for accommodating the external threads of an inward extension of the valve closure block in a fixedly tight arrangement therewith. That is, the plunger carries the closure block as it moves up and down in operation.

It should be further noted that the bottom end 118 of the plunger is just slightly below the upward shoulder 120 of chamber 92, shoulder 120 defining the lowest part of the valve body which provides magnetic flux to the plunger during its operation. The bottom end of the plunger is also conically tapered at surface 119. The magnetic operation of the plunger is described more fully hereinafter.

The upward end 122 of plunger 114 is conically shaped at a preferred angle between 30° and 60°. The valve block portion which is opposed to conical surface 122 has an internal compatible surface 124 so that thee is a magnetic gap between surfaces 122 and 124 which is provided during operation of the plunger. The upward extension of the valve block just described is fixedly in contact with the solenoid housing to be described hereinafter. As such, it becomes an operable part of this housing.

A post 126 is provided in the upper end of the plunger, which is capped by a suitable spinner 128 onto which a suitable biasing spring 130 operates. The spring is accommodated within a chamber in the housing portion which is located over the post 126 and spinner 128 just described. This chamber is internally threaded to accommodate an externally threaded plug 132 which has a depending portion 134 fitting into spring 130 and which determines the amount of biasing force provided by spring 130 in a downward direction for the plunger. Plug 132 can be conveniently sealed in place by solder 136 once the proper tension bias adjustment has been made to the spring.

Valve body 90 is of ferromagnetic material, as is plunger 114. Also, the solenoid housing described is of ferromagnetic material.

Now referring to FIG. 8, the valve which has just been described is shown with a solenoid assembly generally referred to by reference numeral 138 surrounding the upper end of the housing portion of the valve body which has just been described. A coil 140 provides magnetic flux for operating the plunger through signals provided by electric leads 142. In the preferred electronics control circuit described above, such signals are in the form of duty cycle oscillations, the leading and trailing edges of which are ramp shaped. The solenoid housing 144 is provided with suitable bottom and top plates and is held in position by a cap 146 which is screwed onto external threads of the top portion of the valve body housing.

Now with respect to FIG. 7, magnetism provided by the solenoid coil causes the plunger to move upwardly to reduce the size of the gap between surfaces 122 and 124 which have previously been described, thereby opening the outlet port at valve seat 104 and closure 110. When the magnetism decreases, the bias spring causes the valve closure to shut vis-a-vis the valve seat. The plunger has a linear response to the average applied signal to the coils until the bottom end of the plunger 118 rises in its movement above shoulder 120. At this time, magnetic flux is provided inclose proximity to the end of the plunger and therefore causes an attraction of the plunger in opposition to the magnetism which is provided by the gap at the upper end thereof. Conical shaping of surface 119 provides fine tuning of the magnetics by providing a non-uniform gap between the solenoid plunger and the housing. Hence, the plunger linear movement in response to applied magnetic flux no longer is obtained, but instead the plunger slows down and eventually stops before the gap at the upper end is reduced to surface touching. That is, the upper end never touches the valve body housing. It should be noted that the lower end of plunger 114 is tapered or otherwise shaped and provides gap characteristics that are necessary to slow down the plunger operation when it is operating at the upper limits of the plunger movement. This helps prevent unnecessary shocks from being imparted to the fluid through the valve. The shear operation of closure 110 with respect to seat 104 also assists in minimizing shocks to the fluid through the valve.

Inlet port connection 98 is preferably in line with the axis of the plunger, but it can be offset or at an angle to the chamber other than in line, if desired. Alternatively, the sliding valve seat and valve closure action can be in conjunction with the inlet port, rather than the outlet port. In such arrangement, the inlet port would be connected to the side of the chamber.

In operation, the valve described and shown will not only slow down as it approaches the upper limit of plunger movement as it fully opens the valve outlet port, it also moves slowly in initiating shutting action until the gap at the lower end disappears.

As previously mentioned, flow restrictions can be provided in the system to help regulate the problems presented by the pulsed opening and closing of the solenoid expansion valve 38. One such type of restriction is commonly called a distributor which is positioned downstream of the expansion valve at the inlet side of the evaporator 44. In fact, a distributor is nothing more than a plurality of fluid lines 40 connecting the output side of expansion valve 44 to the input side of evaporator 44. With prior-art expansion valves, "flashing" normally occurs at the output side of the expansion valve because of the pressure drop thereacross. Flashing is a term of art which describes the presence of gas bubbles in the liquid coolant as it exits the expansion valve. With the pulsing operation of expansion valve 38 in accordance with the present invention, this pressure drop across the valve is effectively minimized since the valve is either fully open or fully closed. Accordingly, flashing is minimized, and as a result, the fluid flow into each of the distributor tubes 40 is essentially equal, i.e., the fluid is equally distributed into each tube. Better fluid flow results in less pressure drop across the restriction and better flow control therethrough.

It has been noted that the oscillating of the valve closure mechanism averages out and thereby eliminates hysteresis errors in the control of the expansion valve. Heat motors connected for powering the valve plunger instead of a magnetic solenoid could also be used, but these type of motors also suffer from hysteresis effects. Oscillating such motors about a controlled value would thereby average out the hysteresis errors in such a heat motor system.

In an additional aspect of the invention, the solenoid valve of the present invention could be controlled to effect communications through the components of an air conditioning system itself. Movement of the orifice closing mechanism to increase or decrease the orifice opening produces a pressure variation in the fluid coolant flowing therethrough. If an information coded signal having a freqency near the upper range of response of the solenoid valve is superimposed onto the normal control signal to the valve, it is possible to inject into the fluid as a pressure signal the information carrying signal. Appropriate pressure detectors could be placed in the system to receive the transmitted information. In this manner, control information, for example, could be transmitted from one point to another point by the coolant fluid as the transmission medium.

In accordance with the present invention, because of the large control range in the valve 38, it is possible to vary the operating parameters of the refrigerant system and still maintain the superheat. By allowing condensing temperatures to fall in low ambient temperature conditions, the system can run at a much higher coefficient of performance thus providing a great energy savings. This energy savings is reflected as a reduction in the amount of energy required to operate the system.

In describing the invention, reference has been made to its preferred embodiment. However, those skilled in the art and familiar with the disclosure of the invention may recognize additions, deletions, substitutions, or other modifications which would fall within the purvue of the invention as defined in the appended claims.

What is claimed is:

1. A refrigeration system comprising:
   (a) compressor means having an inlet and an outlet end;
   (b) a condenser means connected to the outlet end of said compressor means and responsive to a high pressure gaseous phase recirculating refrigerant for condensing the refrigerant from its gaseous to its liquid phase;
   (c) an evaporator means having an inlet and an outlet end connected to the outlet end of said condenser means and to the inlet end of said compressor means, respectively;
   (d) said evaporator means having an associated solenoid-actuated expansion valve having an inlet and an outlet end connected between the outlet end of said condenser means, and the inlet end of said evaporator means, said condenser means delivering high pressure liquid refrigerant to the inlet end of said expansion valve, said refrigerant expanding as it flows through said expansion valve;
   (e) said solenoid-actuated valve including an associated on-off modulator responsive to the instantaneous superheat of said refrigerant in said evaporator means for generating a variable duty cycle on-off modulated solenoid control signal, said solenoid control signal alternatively energizing and de-energizing said associated solenoid-actuated valve for each cycle of said control signal to cycle said valve from a first flow rate position to a second flow rate position without imparting shock waves to the refrigerant thereby to obtain an average flow rate of refrigerant through the valve which results in a desired superheat for the refrigerant in said evaporator means, said valve further including a flush cycle timer means for generating a flush cycle having a time interval during which said associated expansion valve is controlled to permit full flow therethrough to fill said associated evaporator means with liquid refrigerant; and
   (f) control means for periodically initiating flush cycles for said expansion valve whereby said valve is opened for full flow therethrough during the flush cycle so that said evaporator means is flushed of compressor lubricant oils which may have accumulated therein.

2. The system of claim 1 wherein said system includes a plurality of said evaporator means and associated solenoid expansion valves, said control means initiating flush cycles for each of said plurality of expansion valves.

3. The system of claims 1 or 2 wherein said control means comprises a microprocessor means.

4. The system of claim 3 wherein each said flush cycle comprises a first time interval during which an associated said expansion valve is fully closed, followed by a second time interval during which the valve is fully opened.

5. The system of claim 4 wherein said microprocessor means includes means for determining the operating conditions of all of said expansion valves in said system, and for determining an optimum flush cycle time interval for each said expansion valve whereby said associated evaporator means is filled with liquid refrigerant without producing liquid refrigerant at the outlet ends thereof.

6. The system of claim 1 wherein said first flow rate position results in a fully open maximum flow rate therethrough, and said second flow rate position results in a fully closed zero flow rate therethrough, said average flow rate being determined by the duty cycle of said solenoid control signal.

7. The system of claim 1 wherein said valve further includes a closure rate control means controlling the rate of change in flow rate positions of said valve between said first and said second flow rate positions, and vice versa, thereby to minimize any pressure shock waves in said refrigerant on opening or closing of said valve.

8. The system of claim 6 wherein said valve further includes a closure rate control means for controlling the rate of change in flow rate positions of said valve between said fully open and said fully closed positions, and vice versa, thereby to minimize any pressure shock waves in said liquid refrigerant on opening or closing of said valve.

9. The system of claims 7 or 8 wherein said closure rate control means is an electronic circuit which controls the slope of the pulse edges in the on-off solenoid control signal.

10. The system of claim 9 wherein each of said closure rate control means, said control means, said flush timer means, and said on-off modulator is a microprocessor means programmed to perform the respective functional operations.

11. A refrigeration system comprising:
   (a) a compressor means having an inlet and an outlet end;
   (b) a condenser means having an inlet and an outlet end, the inlet end connected to the outlet end of said compressor means and responsive to a high pressure gaseous phase recirculating refrigerant for condensing the refrigerant from its gaseous to its liquid phase;
   (c) an evaporator means having an inlet and an outlet end connected to the outlet end of said condenser means and to the inlet end of said compressor means, respectively;
   (d) said evaporator means having an associated solenoid actuated expansion valve having an inlet and an outlet end connected between the outlet end of said condenser means and the inlet end of said evaporator means, said condenser means delivering high pressure liquid refrigerant to the inlet end of said expansion valve, said refrigerant expanding as it flows through said expansion valve;

(e) said valve including an associated flow control means responsive to the instantaneous superheat of said refrigerant in said associated evaporator means for generating a solenoid control signal, said solenoid control signal obtaining an average flow rate of refrigerant through the valve which results in a desired superheat for the refrigerant in said evaporator means, said valve further including a flush cycle timer means for generating a flush cycle having a time interval during which said associated expansion valve is controlled to permit full flow therethrough to fill said associated evaporator means with liquid refrigerant; and (f) a controller means for periodically initiating flush cycles for said expansion valve whereby said evaporator means is flushed of compressor lubricant oils which may have accumulated therein.

12. The system of claim 11 wherein said system includes a plurality of said evaporator means and associated solenoid expansion valves.

13. The system of claims 11 or 12 wherein said controller means comprises a microprocessor means.

14. The system of claim 13 wherein said microprocessor means includes means for determining the operating conditions of all of said expansion valves in said system, and for determining an optimum flush cycle time interval for each said expansion valve whereby said associated evaporator means is filled with liquid refrigerant without producing liquid refrigerant at the outlet ends thereof.

15. The system of claims 11 or 12 wherein each of said flow control means, said controller means and said flush cycle timer means is a microprocessor means programmed to perform the respective functional operations.

16. The system of claim 11 wherein each said flush cycle comprises a first time interval during which an associated said expansion valve is fully closed, followed by a second time interval during which the valve is fully opened.

17. The system of claims 2 or 12 wherein each said evaporator means is an evaporator coil.

18. A refrigeration system employing a vaporizable and liquifiable refrigerant comprising:

(a) a compressor having an inlet and an outlet;

(b) a condensor capable of liquifying the vaporized refrigerant and having an inlet connected to the outlet of the compressor so as to receive compressed, vaporized refrigerant and further having an outlet to discharge the refrigerant in liquid form;

(c) an evaporator, including an expansion coil having an inlet, an outlet and an expansion valve attached to the inlet of the evaporator and to the outlet of the condensor to pass liquid refrigerant from the condensor to the evaporator;

(d) a flow controller responsive to the instantaneous superheat of vaporized refrigerant in the evaporator to control the flow of refrigerant through the expansion valve; and (e) a cycle timer operable to fully open the expansion valve at preselected intervals for preselected periods of time thereby to flush compression lubricant oils that may have accumulated in said evaporator.

* * * * *